(12) United States Patent
Koike et al.

(10) Patent No.: US 10,155,271 B2
(45) Date of Patent: Dec. 18, 2018

(54) CUTTING TOOL AND TOOL BODY

(71) Applicant: Sumitomo Electric Hardmetal Corp., Itami-shi (JP)

(72) Inventors: Yusuke Koike, Itami (JP); Kouki Matsubara, Itami (JP); Katsuya Nakakihara, Itami (JP); Atsuhiko Maeta, Itami (JP)

(73) Assignee: Sumitomo Electric Hardmetal Corp., Itami-shi (JP)

( * ) Notice: Subject to any disclaimer, the term of this patent is extended or adjusted under 35 U.S.C. 154(b) by 108 days.

(21) Appl. No.: 15/311,355

(22) PCT Filed: Jun. 3, 2015

(86) PCT No.: PCT/JP2015/065995
§ 371 (c)(1),
(2) Date: Nov. 15, 2016

(87) PCT Pub. No.: WO2015/198812
PCT Pub. Date: Dec. 30, 2015

(65) Prior Publication Data
US 2017/0080503 A1    Mar. 23, 2017

(30) Foreign Application Priority Data
Jun. 24, 2014  (JP) ................ 2014-128960

(51) Int. Cl.
*B23C 5/00* (2006.01)
*B23C 5/22* (2006.01)
*B23C 5/06* (2006.01)

(52) U.S. Cl.
CPC .......... *B23C 5/2243* (2013.01); *B23C 5/06* (2013.01); *B23C 5/2221* (2013.01);
(Continued)

(58) Field of Classification Search
CPC .......... B23C 2210/168; B23C 2210/16; B23B 2205/12; B23B 2205/00
See application file for complete search history.

(56) References Cited

U.S. PATENT DOCUMENTS

2003/0072625 A1*  4/2003  Morgulis ............. B23C 5/2221
                                                                407/35
2006/0088390 A1*  4/2006  Wallstrom ........... B23B 27/1662
                                                                407/103
(Continued)

FOREIGN PATENT DOCUMENTS

JP   H07-251302 A   10/1995
JP   2000-503913 A   4/2000
(Continued)

OTHER PUBLICATIONS

International Search Report in counterpart International Application No. PCT/JP2015/065995, dated Aug. 25, 2015.

*Primary Examiner* — Will Fridie, Jr.
(74) *Attorney, Agent, or Firm* — Venable LLP; Michael A. Sartori; Laura G. Remus

(57) ABSTRACT

A cutting tool including: a tool body (2) provided with an insert support seat (5) including a major seat surface (5a) that supports a bearing surface of a cutting insert, a plurality of seat side surfaces (5b, 5c) that supports side surfaces of the cutting insert at different positions, and a thinned portion (5d) continuous with the major seat surface and the seat side surfaces; and a cutting insert attached to the insert support seat, wherein a ridge at a position where the major seat surface and the thinned portion intersect, a ridge at a position where the seat side surface and the thinned portion intersect, and a ridge at a position where the thinned portions continuous with each other intersect are each formed of a convex arc curved surface.

6 Claims, 5 Drawing Sheets

(52) U.S. Cl.
CPC . *B23C 2200/0411* (2013.01); *B23C 2200/125* (2013.01); *B23C 2210/168* (2013.01)

(56) References Cited

U.S. PATENT DOCUMENTS

| | | | | |
|---|---|---|---|---|
| 2007/0003384 | A1* | 1/2007 | Smilovici | B23C 5/2221 407/113 |
| 2012/0301235 | A1* | 11/2012 | Yoshioka | B23C 5/06 407/100 |
| 2014/0161545 | A1* | 6/2014 | Inagaki | B23B 27/1603 407/42 |
| 2014/0334890 | A1* | 11/2014 | Takahashi | B23C 5/109 407/114 |
| 2014/0348600 | A1* | 11/2014 | Matsubara | B23C 5/2221 407/64 |
| 2014/0369773 | A1* | 12/2014 | Waggle | B23C 5/003 407/54 |
| 2015/0298223 | A1* | 10/2015 | Kumoi | B23C 5/109 407/102 |
| 2015/0336187 | A1* | 11/2015 | Choi | B23C 5/06 407/48 |
| 2015/0367422 | A1* | 12/2015 | Aso | B23C 5/109 407/104 |
| 2016/0023285 | A1* | 1/2016 | Saji | B23C 5/207 407/33 |
| 2016/0271707 | A1* | 9/2016 | Lee | B23C 5/207 |
| 2016/0375506 | A1* | 12/2016 | Koike | B23C 5/06 407/48 |

FOREIGN PATENT DOCUMENTS

| | | |
|---|---|---|
| JP | 2010-523352 A | 7/2010 |
| JP | 2013-078828 A | 5/2013 |
| JP | 2013-176834 A | 9/2013 |
| WO | 2014/088008 A1 | 6/2014 |

* cited by examiner

CUTTING TOOL AND TOOL BODY

TECHNICAL FIELD

The present invention relates to a cutting tool such as a face milling cutter, particularly to a cutting tool in which an insert support seat provided in a tool body is elaborately designed.

BACKGROUND ART

In some known cutting tools, a tool body is provided with an insert support seat, to which a cutting insert is attached, and a cutting edge is formed by the cutting insert.

The insert support seat of a cutting tool of this type is provided in a tool body by directly machining the tool body or machining a separate component called a locator and fixing the locator to the tool body.

The insert support seat includes a major seat surface that supports a bearing surface of the cutting insert, a seat side surface that supports a side surface of the cutting insert, and a thinned portion that is continuous with the major seat surface and the seat side surface.

The thinned portion is provided for the purpose of avoiding interference with the tool body of a cutting edge located at a position at which the cutting edge does not contribute to cutting of the cutting insert, and avoiding stress concentration on a corner portion between the major seat surface and the seat side surface and a corner portion between the seat side surfaces.

The insert support seat of a conventional cutting tool is machined using a plurality of tools, for instance, a drill and an end mill selectively, and for an insert support seat in a complicated shape, a sharp edge is left, for instance, at a position where the major seat surface and a thinned portion intersect, or at a position where a seat side surface and a thinned portion intersect, or further at a position where adjacent thinned portions intersect.

An insert support seat in such a shape is described, for instance, in PTL1 and PTL2.

CITATION LIST

Patent Literature

PTL 1: Japanese Unexamined Patent Application Publication No. 2013-078828
PTL 2: Japanese Unexamined Patent Application Publication No. 2013-176834

SUMMARY OF INVENTION

Technical Problem

As described above, the insert support seat of a conventional cutting tool is machined using a plurality of tools. For an end mill, a tool for rough machining and a tool for finish machining may be used, and for drill machining, drills with different diameters for machining may be used.

Like this, with a method of using a plurality of tools selectively, the number of tools necessary for machining increases, and the cost of tools and the time for replacing a tool increase, which is not preferable.

In addition, use of a machining tool with a smaller diameter subject to constraints due to the quality (hardness) of material of a workpiece and a protrusion amount of the tool from a tool holder, and thus a degree of flexibility in designing the shape of the insert support seat reduces.

Furthermore, a thinned portion larger than necessary has to be formed, which may cause decrease in the stiffness of the tool body.

Presence of sharp edges inside the insert support seat may also cause decrease in the strength and stiffness of the tool body, and for an insert support seat in a complicated shape which is directly machined on the tool body, there are some locations where particularly, honing processing cannot be performed, and thus sharp edges are left.

An object of the present invention is to enable machining of an insert support seat provided in a tool body with a fewer number of machining tools, and further improving a degree of flexibility in designing the shape of the insert support seat, and preventing decrease in the stiffness of the tool body.

Solution to Problem

In order to solve the above-mentioned problem, in the resent invention, an insert support seat of a cutting tool is formed in the following manner below, the cutting tool comprising: a tool body provided with the insert support seat including a major seat surface that supports a bearing surface of a cutting insert, a plurality of seat side surfaces that supports side surfaces of the cutting insert at different positions, and a thinned portion continuous with the major seat surface and the seat side surfaces; and a cutting insert attached to the insert support seat.

That is, the insert support seat has a structure in which a ridge at a position where the major seat surface and the thinned portion intersect, a ridge at a position where the seat side surface and the thinned portion intersect, and a ridge at a position where the thinned portions continuous with each either intersect are each formed of a convex arc curved surface.

Advantageous Effects of Invention

The cutting tool of the present invention can machine the insert support seat provided in the tool body by one end mill using a multi-axis machining center with numerical control.

In addition, it is possible to improve the degree of flexibility in designing the shape of the insert support seat and the degree of flexibility in machining, and to prevent decrease in the stiffness of the tool body.

DESCRIPTION OF EMBODIMENTS

Figure 1:
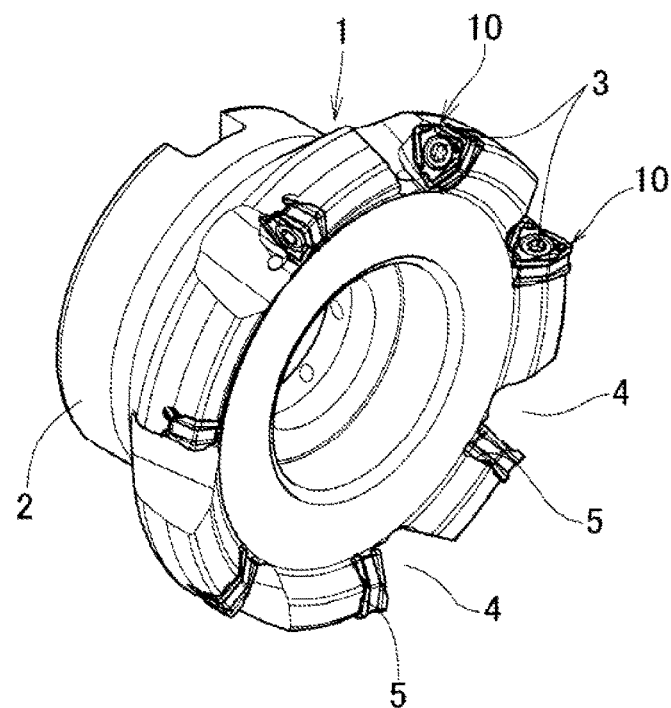
FIG. 1 is a perspective illustrating an example of a cutting tool according to the present invention.
Figure 2:
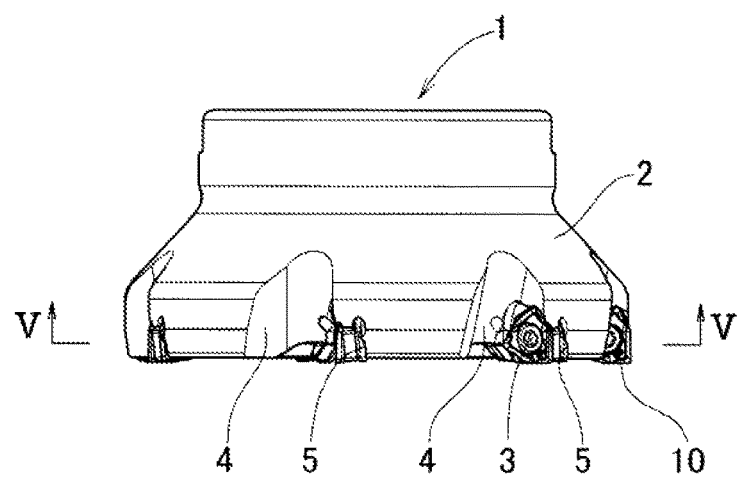
FIG. 2 is a side view of the cutting tool of FIG. 1.
Figure 3:
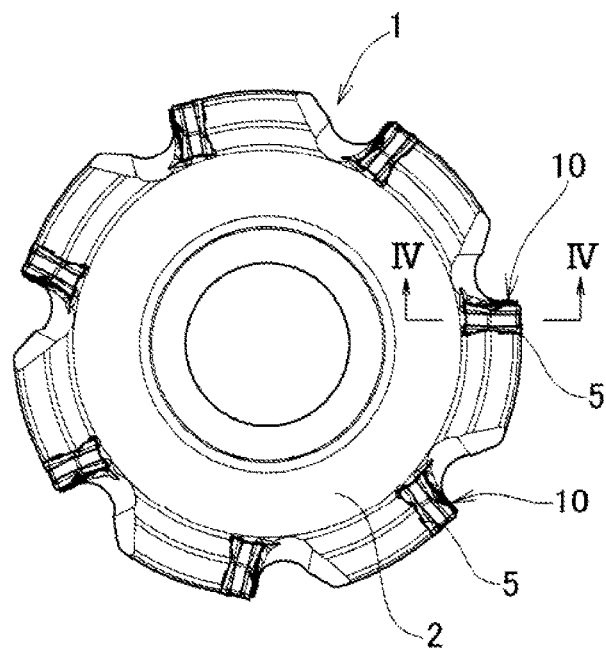
FIG. 3 is a front view of the cutting tool of FIG. 1.
Figure 4:
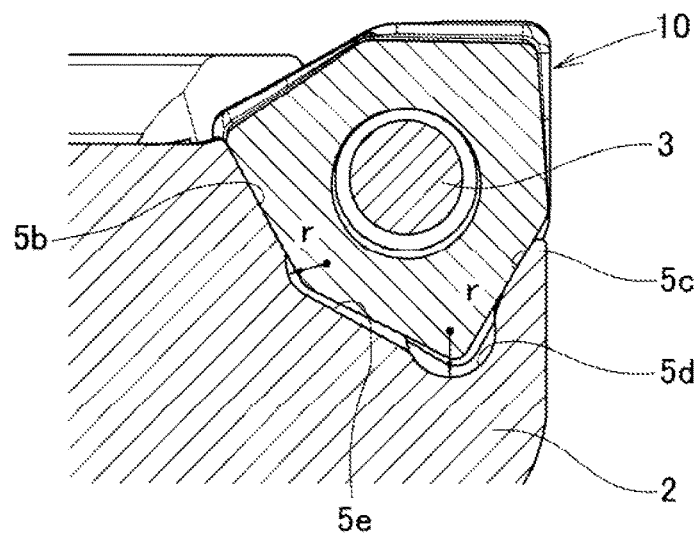
FIG. 4 is an enlarged sectional view at a position taken along line IV-IV of FIG. 3.
Figure 5:
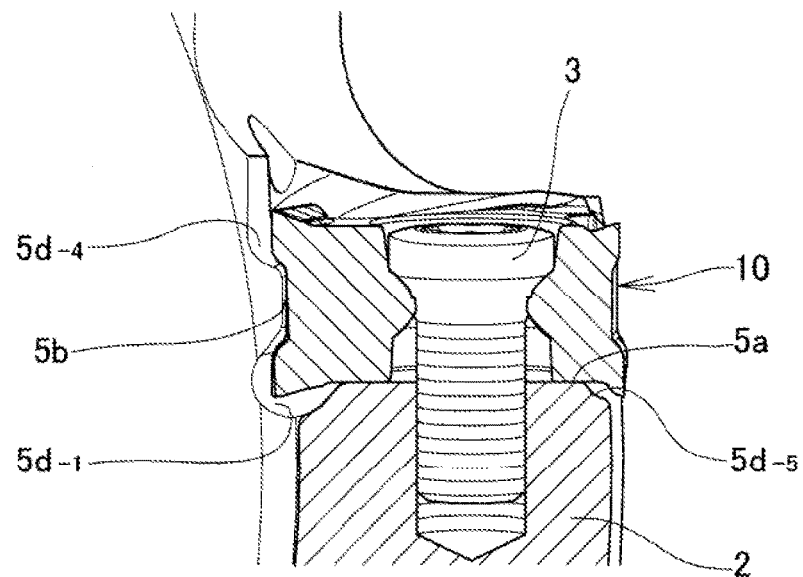
FIG. 5 is an enlarged sectional view at a position taken along line V-V of FIG. 2.

Hereinafter, an embodiment of a cutting tool in the invention will be described based on FIGS. 1 to 7.

A cutting tool 1 in the example is obtained by applying the invention to a face milling cutter, and a cutting insert 10 is attached to a tool body 2 by using a clamp bolt 3.

On the outer circumference of the tool body 2, chip pockets 4 and insert support seats 5 facing respective chip pockets are circumferentially provided with a constant pitch.

The insert support seats 5 each have a major seat surface 5a (see FIGS. 5 to 7) provided with a bolt hole 6 into which a clamp bolt 3 is to be screwed, and two seat side surfaces 5b, 5c (see FIGS. 4 to 7). In addition, each insert support seat 5 has a thinned portion which is provided for the purpose of avoiding interference of a cutting edge located at a position at which the cutting edge does not contribute to cutting, and further avoiding stress concentration on a corner portion between the major seat surface 5a and the seat side surfaces 5b, 5c and a corner portion between the seat side surfaces.

The insert support seat 5 is formed by using a multi-axis machining center, for instance, 5-axis control machining center and a ball end mill (one ball end mill is sufficient), and performing machining using a copy milling technique by numerical control so that the entire area is finished with a designed geometry.

Machining by numerical control using a multi-axis machining center can be performed while a machining tool (ball end mill) and a workpiece being inclined in a predetermined direction, and thus a degree of flexibility of the machining is high, and constraints on machining are unlikely to occur. Therefore, a protrusion amount of a tool from a tool holder can be reduced.

Therefore, a ball end mill to be used may have a small machining diameter, and radius of r of a longitudinal perpendicular section of arcs in a first thinned portion (see FIG. 6, this is denoted by $5d_{-1}$ for the sake of convenience) between the major seat surface 5a and the seat side surfaces 5b, 5c, and a second thinned portion (this is denoted by $5d_{-2}$) at the corner between the seat side surface 5c and an intermediate surface 5e (this is a non-support surface) and at the corner between the seat side surface 5b and the intermediate surface 5e, the thinned portions being machined using a drill in a conventional manner, can be smaller than in a conventional tool, and thus it is possible to prevent decrease in the tool stiffness. Here, the longitudinal perpendicular section of arcs means that a section perpendicular to a line connecting the centers of arcs included in a curved surface.

In general, a thinned portion between the major seat surface and a seat side surface, and a thinned portion between seat side surfaces have a radius on the order of 0.5 mm to 1.5 mm (diameter: 1 mm to 3 mm), and it was difficult to reduce the radius below the value, where the portions are machined using a drill in a conventional manner. However, according to the present invention, it is possible to reduce the radius r to the order of 0.2 mm to 0.5 mm (diameter: 0.4 mm to 1 mm).

The same goes with a third thinned portion (this is denoted by $5d_{-3}$) between the major seat surface 5a and the intermediate surface 5e, and a fourth thinned portion (this is denoted by $5d_{-4}$) between the seat side surfaces 5b, 5c, the intermediate surface 5e, and the chip pocket 4, where the portions are machined using an end mill in a conventional manner.

Figure 6:
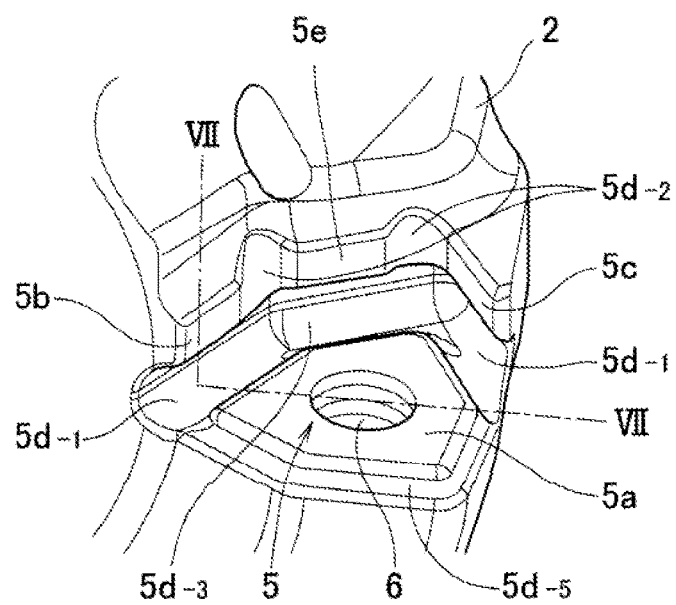
FIG. 6 is a perspective view of an insert support seat provided in a tool body of the cutting tool of FIG. 1.
Figure 7:
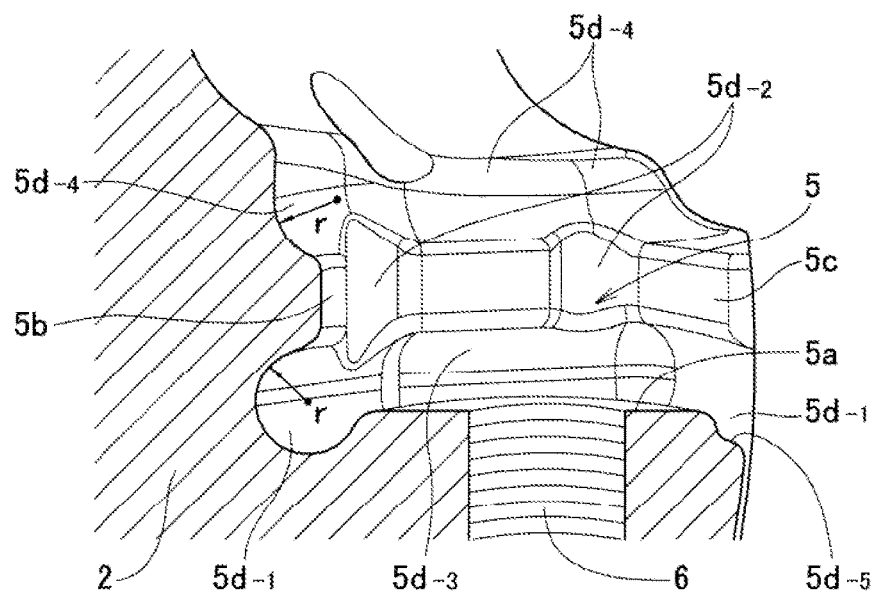
FIG. 7 is an enlarged sectional view at a position taken along line VII-VII of FIG. 6.
Figure 8:
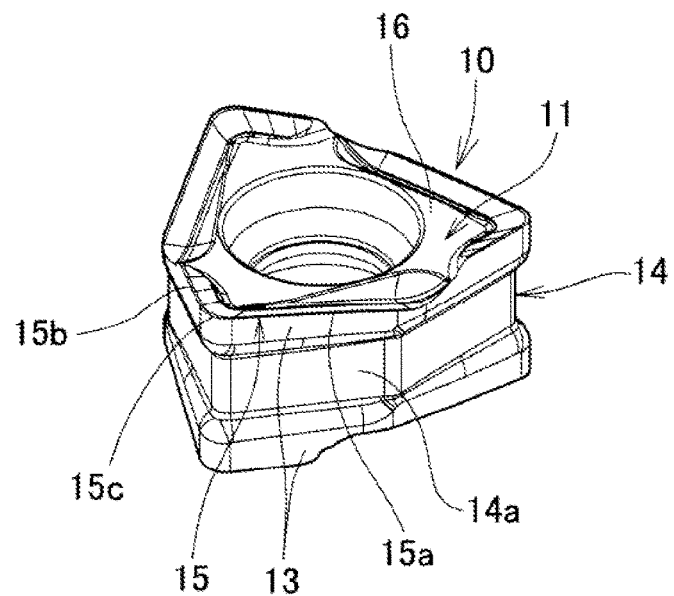
FIG. 8 is a perspective view of a cutting insert which is adopted for the cutting tool of FIG. 1.
Figure 9:
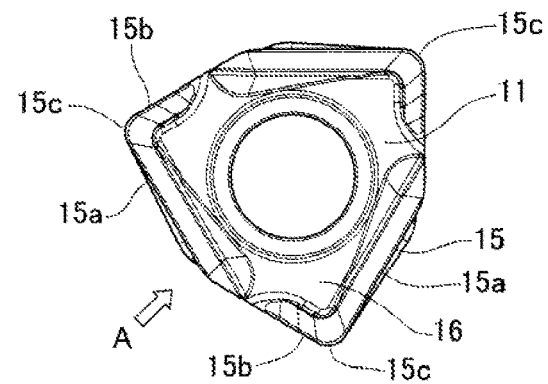
FIG. 9 is a plan view of the cutting insert of FIG. 8.
Figure 10:
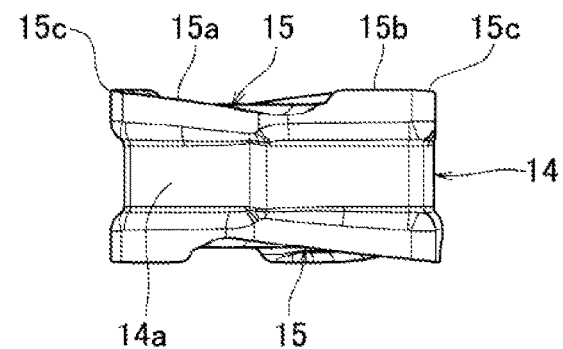
FIG. 10 is a side view of the cutting insert of FIG. 8 as seen in the direction of arrow A of FIG. 9.
Figure 11:
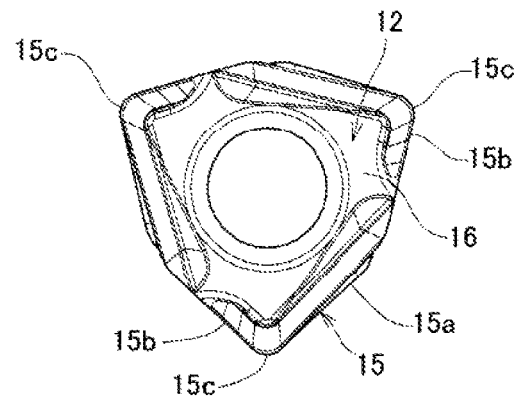
FIG. 11 is a bottom view of the cutting insert of FIG. 8.

As illustrated in FIG. 6, FIG. 7, any ridge formed inside the insert support seat 5, for instance, the ridge at the position where the major seat surface 5a and the first thinned portion $5d_{-1}$ intersect, the ridge at the position where the seat side surfaces 5b, 5c and the intermediate surface 5e, and the second thinned portion intersect, and the ridge at the position where the adjacent first thinned portion and third thinned portion intersect are each configured of a convex arc curved surface, and a sharp edge does not exist inside the insert support seat 5.

In the cutting tool 1 in the example, a fifth thinned portion $5d_{-5}$ is formed between the major seat surface 5a and the side surface of the tool body 2. The ridge between the fourth thinned portion $5d_{-4}$ and the chip pocket 4 is configured of a convex arc curved surface. Furthermore, the ridge at the position where the first thinned portion $5d_{-1}$, the seat side surface 5b and the fifth thinned portion $5d_{-5}$ intersect with the outer circumferential surface of the tool body 2 is also configured of a convex arc curved surface, which provides more preferable form.

The longitudinal perpendicular section of arcs in the ridge at each position can have a radius of 0.1 mm greater.

Although the radius of a ridge rounded by typical honing processing is on the order of 0.03 mm, with this order, the effect of edge reinforcement is not sufficient. However, when a ridgeline has a radius of 0.1 mm or greater, the edge is reinforced without insufficiency.

It is to be noted that an upper limit of the radius of each ridge is of the order of 1.0 mm, more preferably of the order of 0.3 mm to 0.5 mm. When the radius is increased unnecessarily, the amount of thinning of the tool body is increased and the effect of stillness improvement caused by reduced dimension of the thinned portions is undermined.

The cutting insert 10 is mounted on thus configured insert support seat 5, and the cutting tool (the face milling cutter in the FIG. 1 in the example is completed.

The details of the cutting insert 10 adopted for the cutting tool in the example are illustrated in FIGS. 8 to 11. The cutting insert 10 is reversible, in which a hexagonal first surface 11 and second surface 12 having acute angle corners and obtuse angle corners alternately arranged are used as rake faces, and three acute angle corners are used as cutting edges.

A side surface 13 continuous with the first surface 11 and the second surface 12 facing away from each other are separated from each other by a recessed portion 14.

The recessed portion 14 has a bottom surface 14a including flat surfaces that are arranged so as to be continuous with each other at an angle, and two flat surfaces of the bottom surface 14a are supported by the seat side surfaces 5b, 5c of the insert support seat.

In the illustrated cutting insert, the ridge at a position where any one of the first surface 11 and the second surface 12 intersects with the side surface 13 is used as a cutting edge 15. The cutting edge 15 includes a first cutting edge 15a used as the major cutting edge, a second cutting edge 15b used as a flat cutting edge, and a corner edge 15c having a nose R disposed between the first and second cutting edges.

Bearing surfaces 16, which are flat and disposed parallel to each other, are formed in parts of the first surface 11 and the second surface 12 adjacent to the insert center, and one of the bearing surfaces is supported by the major seat surface 5a of the insert support seat.

In the illustrated cutting insert 10, the positions at cutting edge corner are shifted by rotation of 120° around the insert center, which allows three cutting edges to be used by changing the corners.

It is to be noted that the cutting tool to which the present invention is applied is not limited to the milling cutter illustrated. Although the present invention is particularly effective when applied to a cutting tool which uses a cutting insert in a complicated shape, the present invention can be utilized for all cutting tools such as a cutting edge replacement-type end mill, drill, boring bar, turning tool, each of which is formed by attaching a cutting insert to an insert support seat provided, in the tool body.

The cutting insert adopted as the cutting tool of the present invention is not limited to the cutting insert in the illustrated shape. Any known polygonal cutting insert or round cutting insert suitable for machining application can be selected and used.

REFERENCE SIGNS LIST

1 Cutting tool
2 Tool body
3 Clamp bolt
4 Chip pocket
5 Insert support seat
5a Major seat surface
5b, 5c Seat side surface
5$d_{-1}$ First thinned portion
5$d_{-2}$ Second thinned portion
5$d_{-3}$ Third thinned portion
5$d_{-4}$ Fourth thinned portion
5$d_{-5}$ Fifth thinned portion
5e Intermediate surface
6 Screw hole
10 Cutting Insert
11 First surface
12 Second surface
13 Side surface
14 Recessed portion
14a Bottom surface
15 Cutting edge
15a First cutting edge
15b Second cutting edge
15c corner edge
16 Bearing surface

The invention claimed is:

1. A cutting tool comprising: a tool body provided with an insert support seat including a major seat surface that supports a bearing surface of a cutting insert, a plurality of seat side surfaces that support side surfaces of the cutting insert at different positions, and a thinned portion continuous with the major seat surface and the seat side surfaces; and a cutting insert attached to the insert support seat,
wherein the thinned portion includes a first thinned portion, a second thinned portion, a third thinned portion and a fourth thinned portion, and the second thinned portion intersects with the first thinned portion, the third thinned portion and the fourth thinned portion,
wherein a ridge at a position where the major seat surface and the first thinned portion intersect, a ridge at a position where the seat side surface and the second thinned portion intersect, and a ridge at a position where the second thinned portion and the first, third and fourth thinned portions intersect are each formed of a convex arc curved surface.

2. The cutting tool according to claim 1, wherein the convex arc curved surface has a radius of 0.1 mm or greater and 1.0 mm or less in a longitudinal perpendicular section.

3. The cutting tool according to claim 1, wherein the thinned portion disposed between the major seat surface and the seat side surface includes a recessed arc curved surface having a radius r of 0.2 mm to 0.5 mm in a longitudinal perpendicular section.

4. A tool body provided with an insert support seat including a major seat surface that supports a bearing surface of a cutting insert, a plurality of seat side surfaces that support side surfaces of the cutting insert at different positions, and a thinned portion continuous with the major seat surface and the seat side surfaces,
wherein the thinned portion includes a first thinned portion, a second thinned portion, a third thinned portion and a fourth thinned portion, and the second thinned portion intersects with the first thinned portion, the third thinned portion and the fourth thinned portion,
wherein a ridge at a position where the major seat surface and the first thinned portion intersect, a ridge at a position where the seat side surface and the second thinned portion intersect, and a ridge at a position where the second thinned portion and the first, third and fourth thinned portions intersect are each formed of a convex arc curved surface.

5. The tool body according to claim 4, wherein the convex arc curved surface has a radius of 0.1 mm or greater and 1.0 mm or less in a longitudinal perpendicular section.

6. The tool body according to claim 4, wherein a thinned portion disposed between the major seat surface and the seat side surface includes a recessed arc curved surface having a radius r of 0.2 mm to 0.5 mm in a longitudinal perpendicular section.

* * * * *